United States Patent Office 3,279,567
Patented Oct. 18, 1966

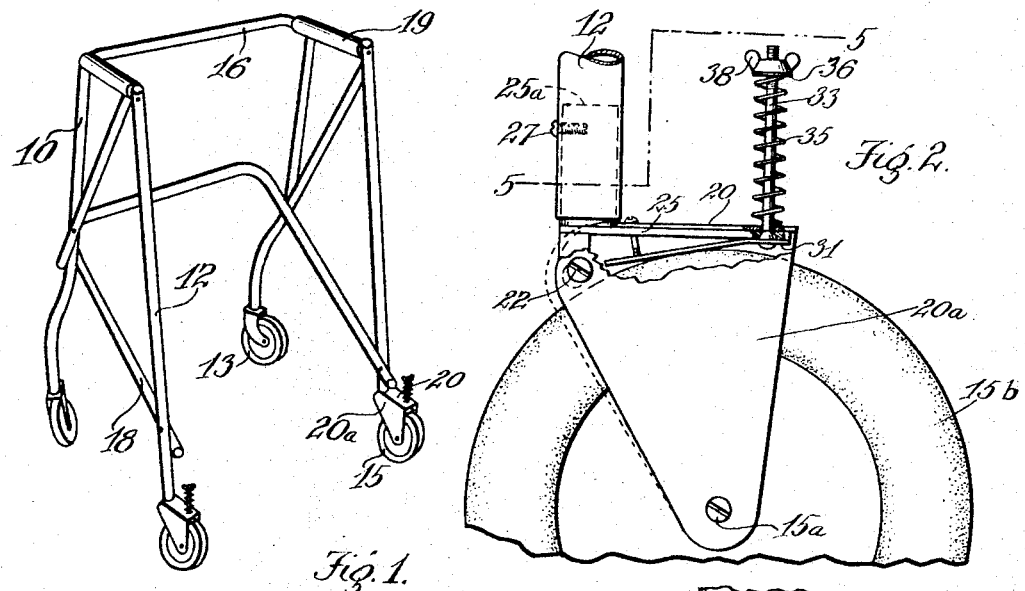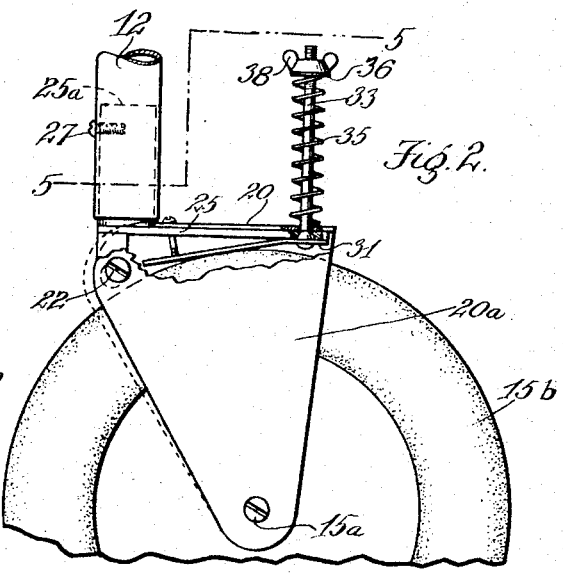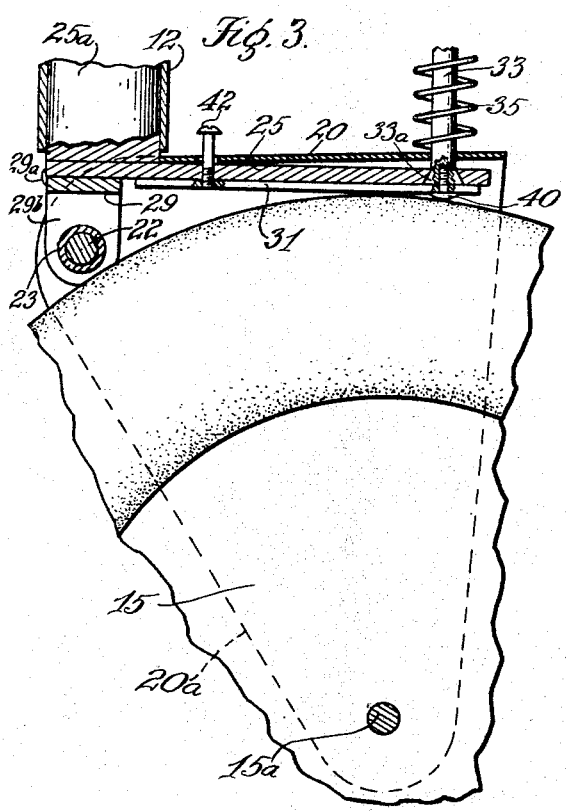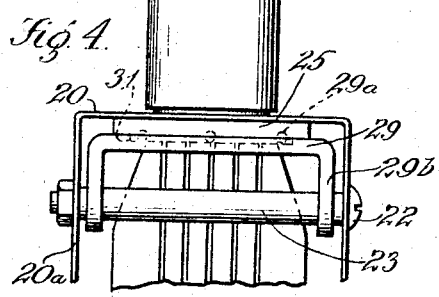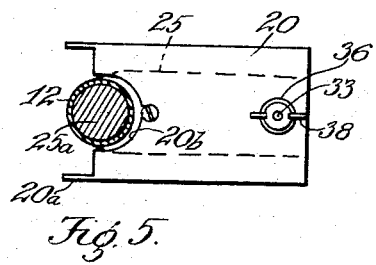

3,279,567
BRAKES FOR WALKING-AID VEHICLES
Norbert F. Kempel, Oak Lawn, Ill.
(Lot 98, 2000 E. Bay Drive, Largo, Florida)
Filed Aug. 31, 1964, Ser. No. 393,222
5 Claims. (Cl. 188—176)

My invention relates to vehicles used by infirm persons to aid them in walking, and more particularly to means for controlling such vehicles. Usually, they are wheeled for easy locomotion, and have the form of an enclosure which is open in the rear to receive the occupant in standing position. A hold on the vehicle is secured by grasping a pair of arm rests at the sides; and the confining form of the enclosure at the front and sides enables the vehicle to be pushed in forward and lateral directions according to walking movements taken by the occupant.

While vehicles of the above character serve efficiently for locomotion, they cannot be relied on to stay in place when left free; and they assume a tendency to roll on uneven or inclined surfaces unless restrained by the occupant. I have found that most infirm persons do not have sufficient equilibrium or strength to restrain walking-aid vehicles tending to creep or roll where floors are not level, but are quite able to impose weight on the arm rests when desiring to restrain the motion of the vehicle. Accordingly, it is the main object of the present invention to utilize this factor for the application of a brake to the rear wheels of the vehicle, whereby to keep the same in place or stop it with very little effort.

A further object is to interpose a connection between the rear frame uprights of the vehicle and the wheels at the bottom thereof for transmitting braking influence to such wheels when slight down-pressure is applied to the arm rests.

Another object is to provide a rear wheel assembly for the vehicle which incorporates a brake engaging the wheel tires on the application of down-pressure to the arm rests, and means automatically releasing the brake when the arm rests are relieved of down-pressure.

A still further object is to incorporate a light drag element in the brake mechanism designed to check the vehicle at all times against free locomotion.

An important object is to design the novel brake in compact and neat form, whereby not to detract in any way from the appearance of the vehicle.

A better understanding of the invention may be gained by reference to the accompanying drawing, in which:

FIG. 1 is a perspective view of a walking-aid vehicle equipped with the novel brake;

FIG. 2 is an enlarged side elevation of the greater portion of a rear wheel assembly, showing the brake in the released position;

FIG. 3 is a similar sectional view, on a larger scale, showing the brake in the applied position;

FIG. 4 is a view of the showing in FIG. 3 from the left-hand side; and

FIG. 5 is a section on the line 5—5 of FIG. 2.

Specific reference to FIG. 1 shows the walking-aid vehicle to be mainly of tubular construction and composed of frontal uprights 10, rear uprights 12, frontal caster wheels 13, rear wheels 15, an upper open frame 16, a lower one 18, and arm rests 19 directed rearwardly from the frame 16 to connect with the rear uprights 12. Down-pressure exterted on the arm rests will be transmitted to the rear uprights; and the novel brake is situated between the lower ends of the rear uprights and the rear wheels 15.

Specific reference to FIGS. 1, 2 and 4 shows that each of the wheels 15 is straddled by a housing 20 having triangular sides 20a. The wheel axle 15a is journaled in the bottom portions of the sides 20a, while the top portions of these—near the front—are joined by a cross-bolt 22 which receives a spacer sleeve 23 between the sides of the housing.

A brake shoe 25 extends underneath the top of the housing 20 from front to rear. At the front the brake shoe has a riser 25a of solid cylindrical construction, the same entering into the bottom portion of the correspondingly-located rear upright 12 to be secured in it by a side screw 27. The housing 20 has a frontal cutout 20b at the top to provide a clearance for the riser 25a. The frontal portion of the brake shoe 25 receives a hanger 29 from underneath—preferably by welding 29a—whose end portions 29b are journaled on the spacer sleeve 23, as shown in FIG. 4.

A blade 31 extends similarly to the brake shoe along the under side thereof. The end portions of the blade receive means for suspending it from the brake shoe; and the blade is tensioned to exert light pressure on the top of the wheel tire 15b, as indicated in FIG. 2, serving to hold the vehicle in one place or wherever it comes to rest. However, when the occupant of the vehicle desires to hold the same in one place, or to check its travel on an incline, simple down pressure on the arm rests will act through the rear uprights, brake shoe 25, hanger 29 and crossbolt 22 to tilt the housing 20 on the axle 15a toward the left as indicated by finely dotted lines in FIG. 2 and full lines in FIG. 3. This motion lowers the brake shoe—as seen in the latter figure—to flatten the blade 31 and exert pressure through it on the wheel tire 15b, accomplishing the application of the brake; and the side-throw of the housing slightly strains the upright 12 in forward direction.

It is noted in FIG. 1 that the head 33a of a vertical bolt 33 is lodged in the rear end of the brake shoe 25, the bolt rising from the latter to receive a compression spring 35, and a washer 36 and wing nut 38 above the spring. In its original position the brake shoe extends in touch with the housing from underneath at the rear, as seen in FIG. 2. However, during the braking action described above the brake shoe departs from the housing at the rear—as shown in FIG. 3—drawing on the spring 35. The latter thus serves to restore the brake shoe to original position when the arm rests and rear uprights 12 are relieved of down pressure. Now the uprights straighten and urge the housing back to its original position. Also, the blade 31 resumes its deflected position as a drag spring in permanent touch with the wheel to keep it from rolling when the vehicle is unattended or standing free on an uneven or inclined surface, the blade, however, presenting no appreciable resistance to the movement of the vehicle by the occupant.

The means for securing the blade will now be described. Thus, a screw 40 driven from the blade into the bolt head 33a secures the rear end of the blade for rising and falling movement with the brake shoe 25. A longer screw 42 is passed through the brake shoe in downward direction to thread into the frontal portion of the blade. Such portion is, of course, tensioned downwardly. However, in case the normal tension of the blade imposes excess friction on the wheel tire, the screw 42 may be advanced sufficiently to draw on the blade and reduce such friction.

It will now be apparent that the novel brake adds a useful facility and a safeguard to walking aid vehicles. While apparently serving as a replacement of plain or caster wheels at the rear, it constitutes a control which can be exercised without any lever or handle, and without requiring the occupant to reach for anything to pull or turn. The usual hold by the occupant on the arm rests of the vehicle affords the means and convenience of applying the brake by simple down-pressure whenever the vehicle is to be held in one place or its travel stopped. Further, because the movement of the brake shoe is very short, only a slight amount of down pressure is required to apply the brake, this rendering the invention suitable for persons who have no strength in their arms or hands. Finally, the device is an assembly of simple parts which are neatly assembled, and of a nature to serve efficiently over a long period of use.

I claim:

1. A brake actuated by an upright of a vehicle frame in relation to a wheel of the vehicle, the wheel having an axle; comprising a housing straddling the wheel with sectoral sides centered on said axle, a pivot between the lower end of the upright and one of the ends of said sides, and a projection of said lower end lowered to engage the top of the wheel as a brake when the upright is depressed, said projection being a bar extending underneath the housing to the region of the other end of said sides, a bolt carried by the bar and rising through the housing, a spring rising above the latter and coiled around the bolt, and a stop for the upper end of the spring carried by the bolt, the lowering of the bar compressing the spring.

2. A brake actuated by an upright of a vehicle frame in relation to a wheel of the vehicle, the wheel having an axle; comprising a housing straddling the wheel with sectoral sides centered on said axle, a pivot between the lower end of the upright and one of the ends of said sides, and a projection of said lower end lowered to engage the top of the wheel as a brake when the upright is depressed, said projection being a bar extending underneath the housing to the region of the other end of said sides, a bolt carried by the bar and rising through the housing, a spring rising above the latter and coiled around the bolt, and a nut threaded on the bolt and forming a variable control for the upper end of the spring, the lowering of the bar compressing the spring.

3. A brake actuated by an upright of a vehicle frame in relation to a wheel of the vehicle, the wheel having an axle; comprising a housing straddling the wheel with sectoral sides centered on said axle, a pivot between the lower end of the upright and one of the ends of said sides, and a projection of said lower end lowered to engage the top of the wheel as a brake when the upright is depressed, said projection being a bar extending underneath the housing to the region of the other end of said sides, and a blade extended from the bar in return direction from said region, such blade being tensioned to apply light pressure to the top of the wheel.

4. A brake actuated by an upright of a vehicle frame in relation to a wheel of the vehicle, the wheel having an axle; comprising a housing straddling the wheel with sectoral sides centered on said axle, a pivot between the lower end of the upright and one of the ends of said sides, and a projection of said lower end lowered to engage the top of the wheel as a brake when the upright is depressed, said projection being a bar extending underneath the housing to the region of the other end of said sides, a blade extended from the bar in return direction from said region, such blade being tensioned to apply light pressure to the top of the wheel, and means adjustable to vary the tension of the blade.

5. A brake actuated by an upright of a vehicle frame in relation to a wheel of the vehicle, the wheel having an axle; comprising a housing straddling the wheel with sectoral sides centered on said axle, a pivot between the lower end of the upright and one of the ends of said sides, and a projection of said lower end lowered to engage the top of the wheel as a brake when the upright is depressed, said projection being a bar extending underneath the housing to the region of the other end of said sides, a blade extended from the bar in return direction from said region, such blade being tensioned to apply light pressure to the top of the wheel, and a screw directed from the bar to thread into the blade, the adjustment of the screw varying the tension of the blade.

References Cited by the Examiner

UNITED STATES PATENTS 2,942,698   5/1960   Bolinger _____ 188—29X

DUANE A. REGER, *Primary Examiner.*